Patented Apr. 7, 1936

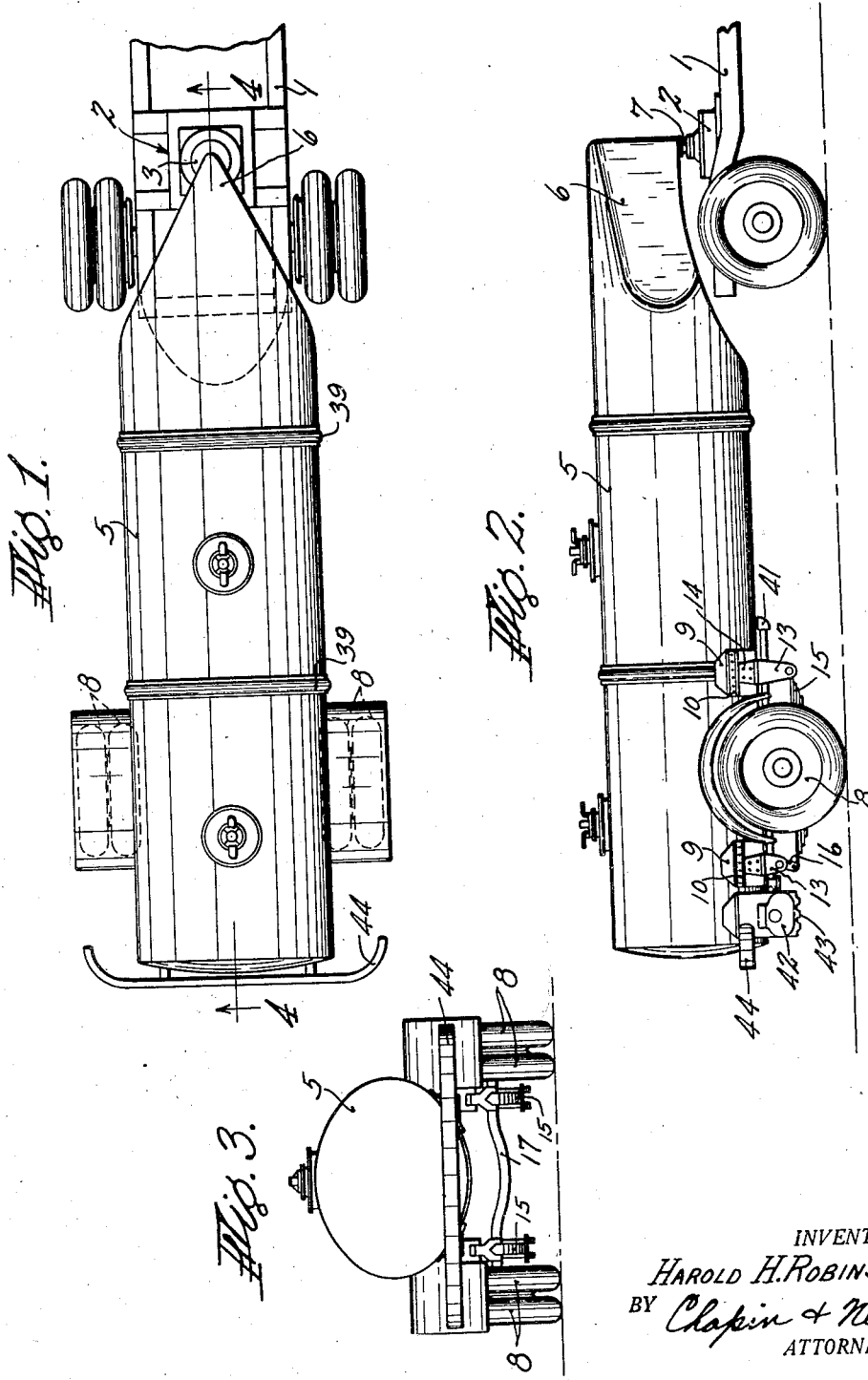

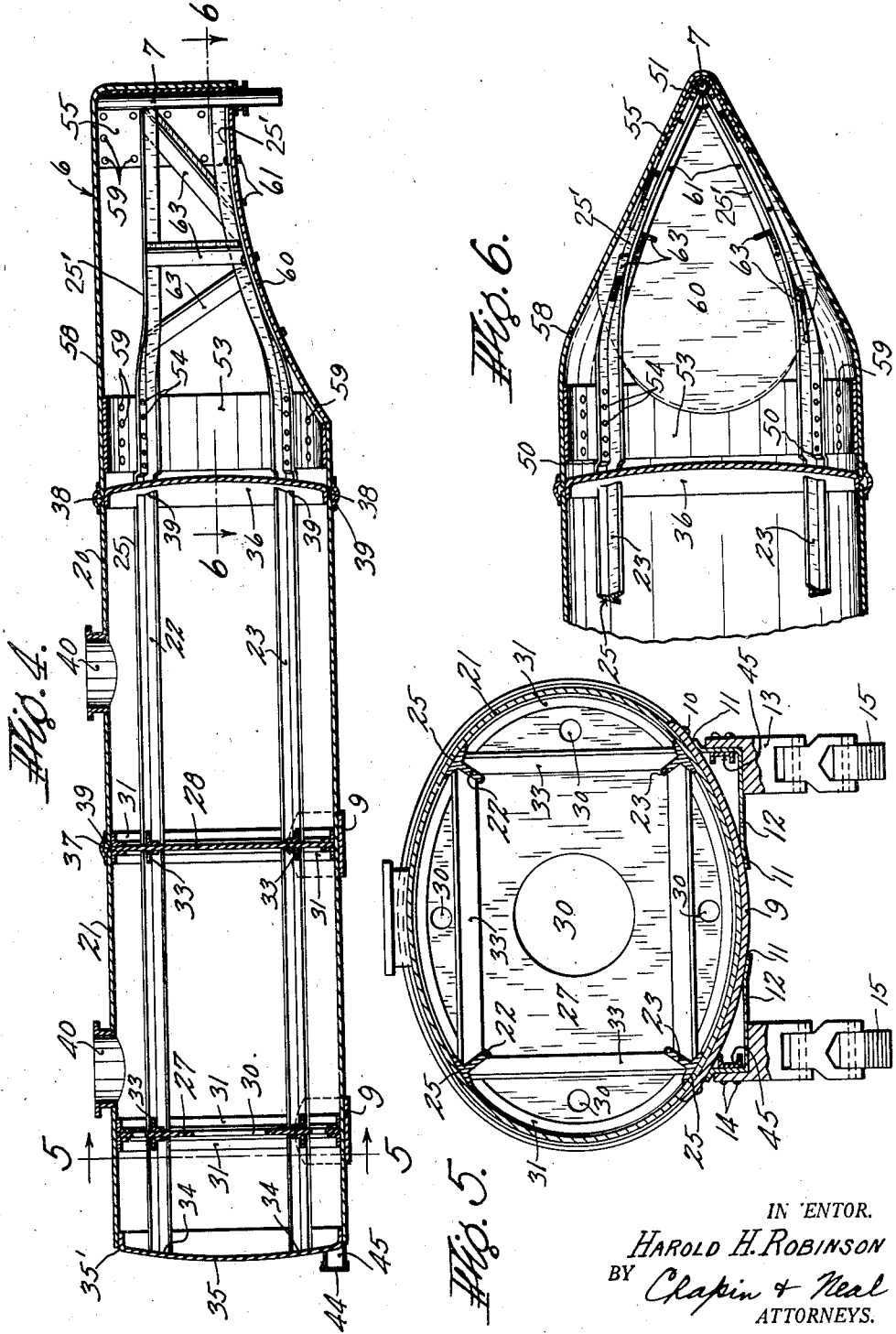

2,036,607

UNITED STATES PATENT OFFICE 2,036,607

TANK TRAILER

Harold H. Robinson, Coral Gables, Fla., assignor to Curtiss Aerocar Company, Inc., Coral Gables, Fla., a corporation of Florida Application July 11, 1933, Serial No. 679,883

5 Claims. (Cl. 280—5)

This invention relates to a trailer construction designed for the transportation of liquids such as gasoline, oil, water and the like. Trailers for this purpose when constructed in the conventional manner are costly to build and operate. Because of their great weight they are destructive of the roads and, when driven at high speeds, constitute a traffic hazard.

It is one object of my invention to provide a tank trailer construction by which the weight may be greatly reduced while permitting a substantially corresponding increase in the load carried and at the same time securing a decrease in construction costs, greater mobility and safety. These and other and further objects and advantages will be made apparent in the following specification and claims.

In the accompanying drawings which illustrate one embodiment of my invention,

Fig. 1 is a plan view of a tank trailer constructed according to my invention;

Fig. 2 is a side elevational view;

Fig. 3 is a rear end view;

Fig. 4 is a sectional view substantially on line 4—4 of Fig. 1;

Fig. 5 is a sectional view substantially on line 5—5 of Fig. 4; and

Fig. 6 is a sectional view substantially on line 6—6 of Fig. 4.

Referring to the drawings, 1 indicates the rear end of a tow car which may be of any suitable type and upon which is mounted a fifth wheel coupler 2, preferably such as is shown and described in detail in copending application Serial No. 283,881, filed June 8, 1928, upon which Patent 1,916,967 issued July 4, 1933. With respect to this coupling device, it is sufficient here to point out that the articulated connection between the vehicles is made at the center of a wheel 3 provided at its periphery with a pneumatic tire or other equivalent annular cushion by which the wheel is secured to the tow car so that shocks due to the draft action are cushioned in all angular positions of the vehicles.

The trailer body comprises a tank 5 oval in cross section. The forward end of the body is formed in the shape of a prow 6 terminating in a post 7, the lower end of which engages in the hub of wheel 3. The rear end of tank 5 is supported by wheels 8 through spaced saddle plates 9 which are formed of steel plate curved to conform to the curvature of the bottom of tank 5 and welded or riveted thereto by rivets 10. Welded to each end of the saddle plates 9 at 11 are spring hanger supports 12, to which are riveted spring hangers 13 by rivets 14. Between hangers 13 on each side of the tank are connected leaf springs 15, the forward end of each spring being connected directly to its hanger while the rear end is connected to the hanger by means of a shackle 16. From the springs the load is transmitted to the axle 17 of wheels 8 by any of the usual and well known methods.

The tank body 5, as shown, is formed of two cylindrical shells 20 and 21, provided with an internal frame structure best shown in Figs. 4 and 5. This frame as shown, comprises four rectangular spaced T irons, the upper pair of which are designated by the reference characters 22 and the lower pair by the reference characters 23. These T irons extend into the prow portion 6 and are connected to the post 7 as will later be more fully described.

Within shell 20—21, the irons 22 and 23 are arranged with their heads 25 positioned to engage against the inside surface of the shell. The irons are held in position and cross braced by surge plate 27 and partition plate 28 which are so positioned as to be in vertical alignment with saddle plates 9. Plate 28 serves to divide the tank into two compartments permitting the carrying of two kinds of liquid. The division of the tank into two parts also facilitates delivery of desired quantities as well as adding to the stability. Plate 27 which is secured to the frame members in the same manner as plate 28 is provided with openings 30 which permit free passage of the fluid from one side of the plate to the other, but provide sufficient constriction to prevent the formation of dangerous surges.

Plates 27 and 28 are oval in outline to conform to the interior of the tank shell 20, and are provided with suitable slits or openings adjacent their edges to permit the passage of members 22 and 23, to which the plates are welded. Additional stiffness is given to the plates 27 and 28 by curved steel angle segments 31 having one flange welded to the plates with the other flange positioned to engage the inner side of the shell 20—21. Additional rigidity is given to the frame as a whole by steel angles 33 arranged in rectangular formation, as shown in Fig. 5, and welded to plates 27 and 28 and frame members 22 and 23. The rear and forward ends of the tank are closed by flanged heads 35 and 36 respectively, which heads also act as further cross bracing for the frame. Rear head 35 is welded at 34 in abutting relationship to the ends of members 22 and 23. Forward head 36 is provided with slits or openings 39 for the passage of members 22 and 23 into the prow portion of the trailer and is welded to said members at these openings. It will be seen that the welding together of the frame, including members 22 and 23, plates 27 and 28, angles 31 and 33, and heads 35 and 36 may all be accomplished prior to enclosing the frame in shell sections 20—21, which may be done by forcing the shells endwise over the frame by heavy pressure. Owing to the production of deleterious gases during welding it is almost impossible to accomplish satisfactory electrical welding in an enclosed space, such as the interior of the tank, and by the structural arrangement described it is unnecessary to attempt it.

The meeting edges of the shells 20 and 21 are welded to each other and plate 26 as at 37. The forward end of shell 20 is similarly welded at 38 to head 36 and nose shell 56 at 36, and these welded joints are preferably covered by bands 39 lightly welded to the shell. The rear end of shell 21 is welded to head 35 at 35'.

The tank is provided with manholes 40 of usual type through which the compartments of the tank may be filled, and piping 41 leading to meter 42 having outlets 43 are provided for discharging the contents of the tank. Protection from damage through rear end collision is afforded by a bumper 44 welded to channel iron supports 45 which in turn are welded to spring hanger supports 12 (Fig. 5).

Within the nose portion 6 the irons 22 and 23 are offset inwardly as indicated at 50 and are then twisted to bring their heads 25 into horizontal planes as indicated at 25' in Figs. 4 and 6. The irons are converged and welded to the prow part 6 as at 51. The offsets 50 are just sufficient to accommodate the thickness of a reenforcing band 53 which is riveted to members 22 and 23 as at 54. A reenforcing plate 55 is bent around the nose post 7 and welded or otherwise secured to the members 22 and 23. The nose shell 56 is riveted to members 53 and 55 as at 59. The irons 22 and 23 on each side are connected together by suitable angle iron braces 63 which are welded at their ends to the irons 22 and 23.

As best shown in Fig. 4, the forward ends of the irons 23 are bent upwardly to give clearance beneath the prow. The underside of shell 56 is cut away and the resulting opening is covered by a curved plate 60 held to irons 23 by bolts 61.

While I have described in detail a satisfactory and preferred manner of constructing the frame and tank, it will be understood that my invention is not limited to the detailed construction shown. In its broader aspect my invention comprehends any suitably constructed frame radially confined within the tank shell and having its parts arranged to cooperate with wheel mountings secured to the outside of the tank shell so that the frame within the shell functions as the chassis of the vehicle.

What I claim is:

1. A tank vehicle, in the form of a semi-trailer attachable to a tractor vehicle, comprising a frame including longitudinal members and transverse members, a tank shell telescoped over and radially enclosing said frame, end members closing the ends of the shell, wheel mountings secured to the outside of the shell in line with transverse members of the frame but structurally separated therefrom by the intervening portions of the shell, a portion at least of the longitudinal frame members being extended through the forward end members of the tank and adapted to receive the draft forces applied to the vehicle, said tank shell and enclosed frame comprising the sole connection between the rear wheel mounting and the point of attachment to the tractor.

2. A tank vehicle in the form of a semi-trailer comprising a tank shell, a combined chassis and tank frame positioned longitudinally of and radially confined within the tank shell, and wheel mountings secured to the shell in position to cooperate with the frame but structurally separated therefrom by the intervening portions of the tank shell, said frame including longitudinal members extended through the forward end of the tank and converged toward and secured to a prow post adapted to be coupled to a tractor, said tank shell and enclosed frame comprising the sole connection between the rear wheel mounting and the point of attachment to the tractor.

3. A tank vehicle in the form of a semi-trailer comprising, a frame including longitudinal members and transverse members welded together to form a rigid girder-like structure, a tank shell telescoped over and radially enclosing said frame, end members closing the ends of the shell, spring supports secured to the outside of the shell adjacent the rear end of the shell, springs secured to said supports, and wheels secured to the springs, a portion at least of the longitudinal members of the frame being extended through the forward end member of the tank and converged toward and connected to a prow post adapted to be coupled to a tractor vehicle, said tank shell and enclosed frame comprising the sole connection between the rear wheel mounting and the point of attachment to the tractor.

4. A tank vehicle in the form of a semi-trailer comprising a frame including four longitudinally positioned members generally T-shaped in cross section arranged in a box-like formation, spaced transverse plate members connecting said longitudinal members, a cylindrical shell telescoped over said frame, end members closing the ends of said shell, spring supports secured to said shell in alignment with said transverse plate members, springs secured to said supports and wheels secured to said springs, said longitudinal frame members being extended through the forward end of the tank and converged toward each other, a vertical post to which the converged ends of the longitudinal frame members are secured, said post adapted to form one element of a fifth wheel coupling, and bracing means connecting the extended portions of the longitudinal frame members.

5. A tank vehicle in the form of a semi-trailer comprising a frame including four longitudinally positioned members generally T-shaped in cross section arranged in a box-like formation with their flanged heads outwardly, a plurality of elliptical plates positioned transversely of the frame, the edges of said plates being provided with cuts to receive the longitudinal members and position the outer surfaces of said members flush with the edges of said plates, said plates and members being welded together, a cylindroidal tank shell telescoped over said frame welded to said plate members, end members closing the ends of said shell, the longitudinal frame members being extended through the forward end of the tank and converged toward each other, a vertical post to which the converged ends of the longitudinal frame members are secured, said post adapted to form one element of a fifth wheel coupling, bracing means connecting the extended portions of the longitudinal frame members, wheel mountings secured to the tank in line with the transverse plate members and wheels secured to said mountings.

HAROLD H. ROBINSON.